(12) United States Patent
Cho et al.

(10) Patent No.: US 8,233,264 B2
(45) Date of Patent: Jul. 31, 2012

(54) MULTILAYER CERAMIC CAPACITOR

(75) Inventors: Soon Sam Cho, Gyunggi-do (KR);
Dong Ik Chang, Gyunggi-do (KR); Doo Young Kim, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 116 days.

(21) Appl. No.: 12/847,362

(22) Filed: Jul. 30, 2010

(65) Prior Publication Data

US 2011/0157766 A1    Jun. 30, 2011

(30) Foreign Application Priority Data

Dec. 24, 2009    (KR) ................. 10-2009-0130813

(51) Int. Cl.
*H01G 4/005*    (2006.01)
*H01G 4/06*    (2006.01)

(52) U.S. Cl. ........................ 361/303; 361/311

(58) Field of Classification Search ........... 361/303–305
See application file for complete search history.

(56) References Cited

U.S. PATENT DOCUMENTS

| | | | |
|---|---|---|---|
| 6,522,521 B2 * | 2/2003 | Mizuno et al. | 361/321.4 |
| 6,930,876 B1 * | 8/2005 | Noguchi et al. | 361/311 |
| 7,046,502 B2 * | 5/2006 | Murosawa et al. | 361/321.2 |
| 7,466,538 B2 * | 12/2008 | Sakamoto et al. | 361/321.1 |
| 2006/0256504 A1 | 11/2006 | Kojima | |
| 2008/0212257 A1 | 9/2008 | Sakamoto et al. | |

FOREIGN PATENT DOCUMENTS

| | | |
|---|---|---|
| JP | 07183155 A * | 7/1995 |
| JP | 10-012476 | 1/1998 |
| JP | 2001-257127 | 9/2001 |
| JP | 2004-356333 A | 12/2004 |
| JP | 2007-335726 A | 12/2007 |
| KR | 10-2005-0062831 | 6/2005 |
| KR | 10-2006-0121745 | 11/2006 |
| KR | 10-2008-0005444 | 1/2008 |

OTHER PUBLICATIONS

Korean Office Action, with English translation, issued in Korean Patent Application No. 10-2009-0130813, mailed Apr. 12, 2011.
Japanese Office Action with English translation issued in Japanese Application No. 2010-163288 issued Mar. 13, 2012.

* cited by examiner

*Primary Examiner* — Eric Thomas
(74) *Attorney, Agent, or Firm* — McDermott Will & Emery LLP

(57) ABSTRACT

There is provided a multilayer ceramic capacitor. The multilayer ceramic capacitor includes inner electrodes and dielectric layers stacked alternately with each other. When a continuity level of each of the inner electrodes is defined as B/A where A denotes a total length of the inner electrode and B denotes a length of the inner electrode excluding pores of the inner electrode, and a section of the inner electrode, having a predetermined length from each end of the inner electrode, is defined as an outer section, a section of the inner electrode excluding the outer section is defined as an inner section, and a section of the dielectric layers from each end of the inner electrode to a corresponding surface of the multilayer ceramic capacitor is defined as an edge section, a length of the outer section is 0.1 to 0.3 times that of the edge section, and the outer section of the inner electrode has a lower continuity level than that of the inner section of the inner electrode.

5 Claims, 2 Drawing Sheets

MULTILAYER CERAMIC CAPACITOR

CROSS-REFERENCE TO RELATED APPLICATIONS

This application claims the priority of Korean Patent Application No. 10-2009-130813 filed on Dec. 24, 2009, in the Korean Intellectual Property Office, the disclosure of which is incorporated herein by reference.

BACKGROUND OF THE INVENTION

1. Field of the Invention

The present invention relates to a multilayer ceramic capacitor and, more particularly, to a multilayer ceramic capacitor capable of preventing a crack and a breakdown (i.e., dielectric break) due to a thermal impact while stably securing capacitance.

2. Description of the Related Art

In general, a multilayer ceramic capacitor includes a plurality of ceramic dielectric sheets and inner electrodes interleaved with the plurality of ceramic dielectric sheets. Because the multilayer ceramic capacitor can implement a high capacitance for its small size and can be easily mounted on a substrate, it is commonly used as a capacitive component for various electronic devices.

Recently, as electronic products (i.e., home appliances, etc.) have become more compact and multi-functional, chip components have also tended to become compact and highly functional. Following this trend, a multilayer ceramic capacitor is required to be smaller than ever before, but to have a high capacity, and at present, a multilayer ceramic capacitor having five hundred or more dielectric layers, each with a thickness of 2 um or less stacked therein, is being fabricated.

In this respect, however, because the ceramic dielectric layers are extremely thin and highly stacked, the volume ratio of the inner electrode layers increases, causing a crack or a breakdown (i.e., dielectric break) in the ceramic laminated body due to a thermal impact applied in the process of mounting them on a circuit board by firing, reflow soldering, or the like.

In detail, a crack is generated as stress caused by the difference of thermal expansion coefficients between a material forming the ceramic layers and a material forming the inner electrode layers acts on the ceramic laminated body, and in particular, both edges of the upper and lower portions of the multilayer ceramic capacitor are mostly cracked.

In addition, stress is also generated at the uppermost and lowermost portions of the dielectric layers due to a thermal change, and in this case, when voltage is applied, a breakdown of the dielectric layers may be generated.

SUMMARY OF THE INVENTION

An aspect of the present invention provides a multilayer ceramic capacitor capable of effectively preventing a crack and a breakdown of a ceramic laminated body due to a thermal impact while stably securing capacitance.

According to an aspect of the present invention, there is provided a multilayer ceramic capacitor including: inner electrodes and dielectric layers stacked alternately with each other, wherein when a continuity level of each of the inner electrodes is defined as B/A where A denotes a total length of the inner electrode and B denotes a length of the inner electrode excluding pores of the inner electrode, and a section of the inner electrode, having a predetermined length from each end of the inner electrode, is defined as an outer section, a section of the inner electrode excluding the outer section is defined as an inner section, and a section of the dielectric layers from each end of the inner electrode to a corresponding surface of the multilayer ceramic capacitor is defined as an edge section, a length of the outer section is 0.1 to 0.3 times that of the edge section, and the outer section of the inner electrode has a lower continuity level than that of the inner section of the inner electrode.

The outer section of the inner electrode may have a continuity level is 0.55 to 0.90 times that of the inner section of the inner electrode.

A portion of the pores of the inner electrode may be filled with ceramics.

The dielectric layers may each have a thickness of 10 um or less.

The number of dielectric layers being stacked may range from 100 to 1000.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
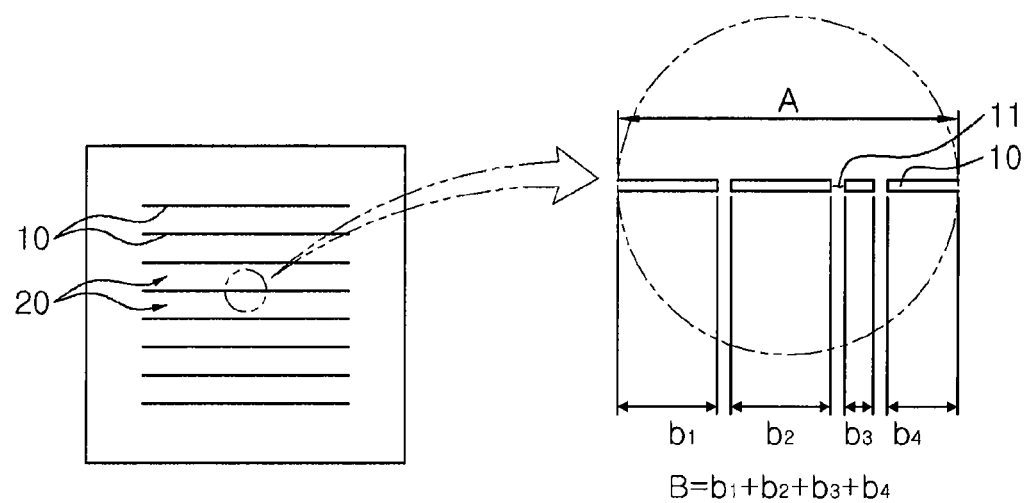
FIG. 1 is a longitudinal sectional view illustrating a typical multilayer ceramic capacitor.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In describing the present invention, if a detailed explanation for a related known function or construction is considered to unnecessarily divert the gist of the present invention, such explanation will be omitted but would be understood by those skilled in the art.

The same or equivalent elements are referred to with the same reference numerals throughout the specification.

It will be understood that when an element is referred to as being "connected with" another element, it can be directly connected with the other element or may be indirectly connected with the other element with element(s) interposed therebetween. Unless explicitly described to the contrary, the word "comprise" and variations such as "comprises" or "comprising," will be understood to imply the inclusion of stated elements but not the exclusion of any other elements.

FIG. 1 is a longitudinal cross-sectional view illustrating a typical multilayer ceramic capacitor.

Referring to FIG. 1, the continuity of each inner electrode 10 is defined as follows.

Each inner electrode 10 within a multilayer ceramic capacitor is not fully continuous but has breaks therein. The inner electrode 10 may have spaces therein since it is formed through a printing method, conducted on one surface of a ceramic green sheet by using a conductive paste containing a metallic powder such as nickel (Ni) or the like.

Accordingly, when the cross-section of a multilayer ceramic capacitor taken in a predetermined direction is viewed, the inner electrode 10 is not fully continuous but has pores 11 in parts thereof.

Referring to FIG. 1, the continuity of each inner electrode 10 may be defined as B/A where A denotes the total length of the inner electrode 10 including pores 11, and B denotes the sum of the lengths of inner electrode portions discontinued by the pores 11, i.e., the length of the inner electrode 10 excluding the pores 11.

The possibility of crack generation, caused by capacitance variations and thermal impact, has the following relationship with the continuity of the inner electrode.

An inner electrode having a high continuity level (i.e., high continuity) means that the inner electrode has almost no breaks (spaces) in it. In this case, such an inner electrode is able to ensure higher capacitance than an inner electrode having a lower continuity level. However, a height difference may occur due to the difference in thermal expansion coefficients between a material of the inner electrode, such as a metallic material such as nickel (Ni), and ceramics. This height difference easily leads to cracks and breakdowns due to thermal impact.

In contrast, an inner electrode having a low continuity level does not ensure capacitance, but reduces a height difference caused by the difference of thermal expansion coefficients between a material forming the inner electrode and ceramics. Thus, cracks and breakdowns due to thermal impact can be prevented.

Accordingly, the continuity of the inner electrode needs to be regulated to an appropriate level, in order to ensure stable capacitance and prevent cracks and breakdowns caused by thermal impact.

Figure 2:
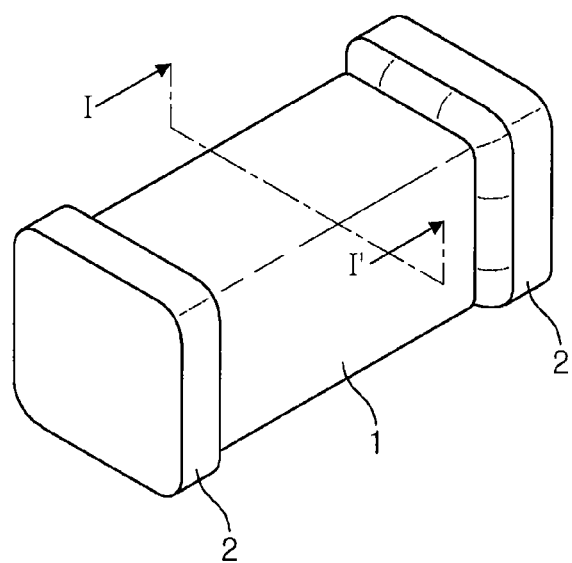
FIG. 2 is a perspective view illustrating a multilayer ceramic capacitor according to an exemplary embodiment of the present invention.

FIG. 2 is a perspective view illustrating a multilayer ceramic capacitor according to an exemplary embodiment of the present invention.

Referring to FIG. 2, the multilayer ceramic capacitor, according to this exemplary embodiment of the present invention, may include a capacitor body 1 and outer electrodes 2.

The capacitor body 1 includes a plurality of dielectric layers stacked therein, and inner electrodes interleaved with the plurality of dielectric layers. In this case, the dielectric layers may be formed by using barium titanate ($Ba_2TiO_3$), and the inner electrodes may be formed of nickel (Ni), tungsten (W), cobalt (Co), or the like.

The outer electrodes 2 may be formed on both side surfaces of the capacitor body 1, respectively. The outer electrodes 2 may serve as external terminals by being electrically connected with the inner electrodes exposed to the outer surface of the capacitor body 1. In this case, the outer electrodes 2 may be formed using copper (Cu) or the like.

Figure 3:
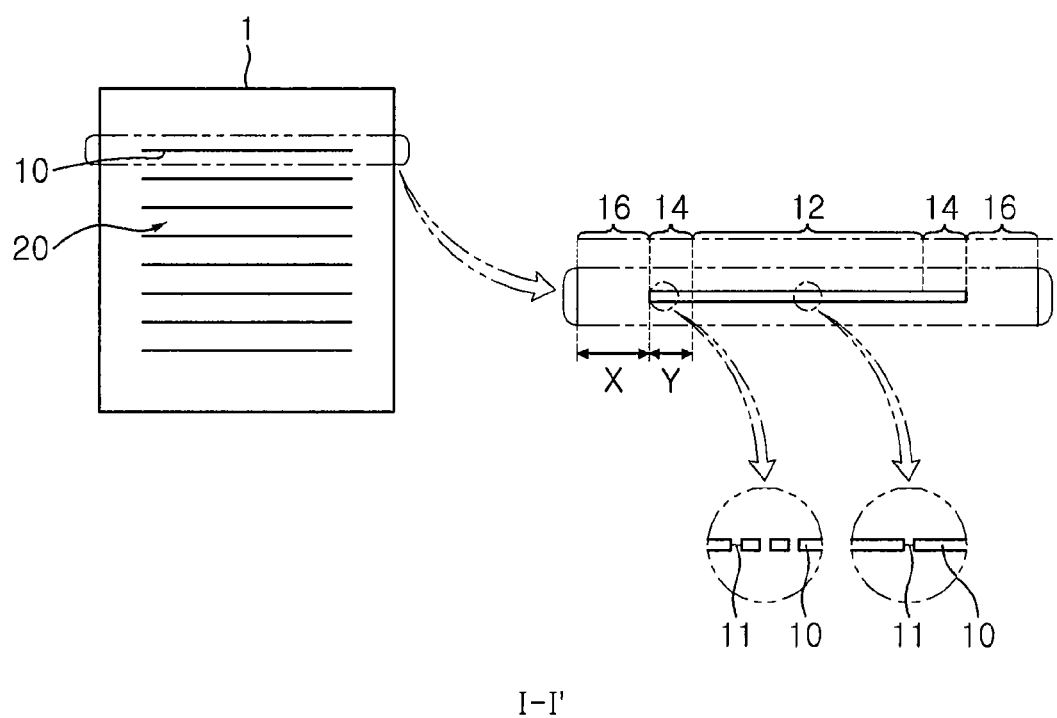
FIG. 3 is a sectional view taken along line I-I' in FIG. 2.

FIG. 3 is a cross-sectional view taken along line I-I' of FIG. 2.

Referring to FIG. 3, the multilayer ceramic capacitor, according to this exemplary embodiment of the present invention, includes the capacitor body 1 including the inner electrodes 10 and the dielectric layers 20 alternated with each other.

Sections of each inner electrode 10, respectively having a predetermined length from both ends of the inner electrode 10, are defined as outer sections 14. A section of the inner electrode 11 other than the outer sections 14 is defined as an inner section 12. In addition, both end portions of the dielectric layer are defined as edge sections 16. Here, the end portions of the dielectric layer are each located between one end of the inner electrode and a corresponding surface of the capacitor body 1, Cracks and breakdowns can be effectively prevented by controlling the continuity level of each outer section 14 of the inner electrode 10 to be lower than that of the inner section 12 of the inner electrode 10. This is because cracks and breakdowns easily occur in the end portions of the inner electrode 10 on which stress is concentrated due to the difference of thermal expansion coefficients between the inner electrode 10 and the dielectric layer 20.

In this case, the length of each outer section 14 and the continuity level of the outer section 14 of the inner electrode 10 can be appropriately controlled through experiments.

TABLE 1

| | Length (μm) | | | | |
|---|---|---|---|---|---|
| No. | Edge section (X) | Outer section (Y) | Dimension ratio (Y/X) | Capacitance (μF) | Frequency of cracks (ea) |
| 1 | 50 | 0 | 0 | 10.6 | 16/500 |
| 2 | 50 | 3 | 0.06 | 10.5 | 7/500 |
| 3 | 50 | 5 | 0.1 | 10.4 | 1/500 |
| 4 | 50 | 10 | 0.2 | 10.3 | 0/500 |
| 5 | 50 | 15 | 0.3 | 10.2 | 0/500 |
| 6 | 50 | 20 | 0.4 | 9.6 | 0/500 |
| 7 | 50 | 25 | 0.5 | 9.3 | 0/500 |

Table 1 shows the result of experiments on capacitance and the frequency of crack generation under thermal impact by varying the length (X) of the edge section and the length (Y) of the outer section of a multilayer ceramic capacitor according to the present invention.

Nickel (Ni) powder, having a particle size of 0.1 um to 0.2 um, was used as a conductive paste for forming the inner electrodes 4. The content of the nickel powder was 40% to 50%.

According to each experiment, the crack generation and capacitance under thermal impact were measured by varying a ratio (Y/X, hereinafter "dimension ratio") of the length (Y) of the outer section to the length (X) to the edge section from 0 to 0.5. For the thermal impact testing, the inner electrodes were dipped in a lead pot at 320° C. for two seconds.

Furthermore, the continuity levels of the inner section 12 and the outer section 14 were set at 90 and 60, respectively.

Referring to Table 1, it can be seen that when the dimension ratio is 0.1 or higher, a crack caused by thermal impact can be effectively prevented. Also, when the dimension ratio exceeds 0.3, the capacitance decreases significantly.

Accordingly, by regulating the dimension ratio to fall within the range of 0.1 to 0.3, a crack can be effectively prevented while stably ensuring capacitance.

TABLE 2

| | | Continuity | | | Frequency |
|---|---|---|---|---|---|
| No. | Dimension ratio (Y/X) | Inner section | Outer section | Capacitance (μF) | of cracks (ea) |
| 1 | 0.3 | 90 | 40 | 9.6 | 0/500 |
| 2 | 0.3 | 90 | 50 | 9.8 | 0/500 |
| 3 | 0.3 | 90 | 60 | 10.2 | 0/500 |
| 4 | 0.3 | 90 | 70 | 10.3 | 1/500 |
| 5 | 0.3 | 90 | 80 | 10.4 | 5/500 |
| 6 | 0.3 | 90 | 90 | 10.5 | 15/500 |
| 7 | 0.3 | 90 | 100 | 10.6 | 16/500 |

Referring to Table 2, it can be seen that capacitance sharply decreases when the continuity level of the outer section of the inner electrode is less than approximately 0.55 times the continuity level of the inner section of the inner electrode. It can also be seen that crack generation increases when the continuity level of the outer section of the inner electrode is approximately 0.9 times the continuity level of the inner section of the inner electrode within the inner section.

Accordingly, a crack can be effectively prevented while stably ensuring capacitance, by setting the continuity level of the outer section of the inner electrode to be 0.55 to 0.90 times the continuity level of the inner section of the inner electrode.

As set forth above, in the multilayer ceramic capacitor according to exemplary embodiments of the invention, a crack and a breakdown, which easily occur at the end portion of an inner electrode, can be prevented by regulating the continuity of the inner electrode.

Further, cracks and breakdowns can be effectively prevented while stably ensuring capacitance, by controlling the lengths of sections of the inner electrode and thus regulating the continuity levels thereof.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer ceramic capacitor comprising:
    inner electrodes and dielectric layers stacked alternately with each other,
    wherein, when a continuity level of each of the inner electrodes is defined as B/A where A denotes a total length of the inner electrode and B denotes a length of the inner electrode excluding pores of the inner electrode, and a section of the inner electrode, having a predetermined length from each end of the inner electrode, is defined as an outer section, a section of the inner electrode excluding the outer section is defined as an inner section, and a section of the dielectric layers from each end of the inner electrode to a corresponding surface of the multilayer ceramic capacitor is defined as an edge section,
    a length of the outer section is 0.1 to 0.3 times that of the edge section, and
    the outer section of the inner electrode has a lower continuity level than that of the inner section of the inner electrode.

2. The multilayer ceramic capacitor of claim 1, wherein the outer section of the inner electrode has a continuity level 0.55 to 0.90 times that of the inner section of the inner electrode.

3. The multilayer ceramic capacitor of claim 1, wherein a portion of the pores of the inner electrode is filled with ceramics.

4. The multilayer ceramic capacitor of claim 1, wherein the dielectric layers each have a thickness of 10 um or less.

5. The multilayer ceramic capacitor of claim 1, wherein the number of dielectric layers being stacked ranges from 100 to 1000.

* * * * *